United States Patent [19]
Logan, Jr.

[11] Patent Number: 6,007,639
[45] Date of Patent: Dec. 28, 1999

[54] BLASTING PROCESS FOR REMOVING CONTAMINANTS FROM SUBSTRATES AND POTASSIUM MAGNESIUM SULFATE-CONTAINING BLAST MEDIA

[75] Inventor: Andrew Logan, Jr., Warren, N.J.

[73] Assignee: Church & Dwight Co., Inc., Princeton, N.J.

[21] Appl. No.: 09/066,632

[22] Filed: Apr. 24, 1998

[51] Int. Cl.[6] .................... B08B 7/00; B24C 1/00; B24C 1/02; C09C 1/68
[52] U.S. Cl. ................... 134/7; 134/6; 134/38; 51/309; 451/38
[58] Field of Search .............. 134/6, 7, 38, 37; 51/309; 451/38

[56] References Cited

U.S. PATENT DOCUMENTS

| | | | |
|---|---|---|---|
| 3,436,175 | 4/1969 | Atwood et al. | 23/119 |
| 3,617,243 | 11/1971 | Neitzel | 71/63 |
| 3,652,208 | 3/1972 | Burk et al. | 23/143 |
| 3,726,965 | 4/1973 | Neitzel et al. | 423/551 |
| 3,814,595 | 6/1974 | Boeglin et al. | 71/61 |
| 3,843,772 | 10/1974 | Boeglin | 423/551 |
| 4,045,335 | 8/1977 | Adams et al. | 209/166 |
| 4,081,266 | 3/1978 | MacKinnon | 71/36 |
| 4,235,857 | 11/1980 | Mangels | 423/344 |
| 4,249,956 | 2/1981 | Hartman | 134/7 |
| 4,285,895 | 8/1981 | Mangels et al. | 264/65 |
| 4,356,136 | 10/1982 | Mangels | 264/65 |
| 4,377,542 | 3/1983 | Mangels et al. | 264/65 |
| 4,388,414 | 6/1983 | Mangels et al. | 501/98 |
| 4,435,160 | 3/1984 | Randklev | 433/9 |
| 4,511,489 | 4/1985 | Requejo et al. | 252/172 |
| 4,552,777 | 11/1985 | Dente et al. | 427/393.1 |
| 4,575,296 | 3/1986 | Kockler et al. | 412/6 |
| 4,606,914 | 8/1986 | Miyoshi | 424/36 |
| 4,731,125 | 3/1988 | Carr | 134/17 |
| 5,112,406 | 5/1992 | Lajoie et al. | 134/7 |
| 5,384,990 | 1/1995 | Spears, Jr. | 451/38 |
| 5,407,378 | 4/1995 | Shank, Jr. | 451/38 |
| 5,424,060 | 6/1995 | Hauschild | 424/52 |
| 5,484,325 | 1/1996 | Shank | 451/38 |
| 5,505,749 | 4/1996 | Kirschner et al. | 51/309 |
| 5,509,971 | 4/1996 | Kirschner | 134/7 |
| 5,562,755 | 10/1996 | Fricke et al. | 95/58 |
| 5,575,705 | 11/1996 | Yam et al. | 451/39 |
| 5,588,901 | 12/1996 | Rubey, III et al. | 451/99 |
| 5,605,491 | 2/1997 | Yam et al. | 451/40 |
| 5,669,945 | 9/1997 | Yam | 51/309 |
| 5,681,205 | 10/1997 | Yam | 451/39 |

FOREIGN PATENT DOCUMENTS

WO 93/10917  6/1993  WIPO.

*Primary Examiner*—Zeinab El-Arini
*Attorney, Agent, or Firm*—Irving Fishman

[57] ABSTRACT

Blast media for removing coatings from sensitive metal and composite surfaces, and a process useful therewith, the blast media contains water-soluble potassium magnesium sulfate. The media may also contain flow/anti-caking agents and alkali metal salts.

25 Claims, No Drawings

BLASTING PROCESS FOR REMOVING CONTAMINANTS FROM SUBSTRATES AND POTASSIUM MAGNESIUM SULFATE-CONTAINING BLAST MEDIA

FIELD OF THE INVENTION

The present invention relates to a process for removing contaminants from a substrate and to blasting media containing potassium magnesium sulfate useful therein.

BACKGROUND OF THE INVENTION

In order to clean a solid surface such that the surface can again be coated such as, for example, to preserve metal against deterioration, or simply to degrease a solid surface, it has become common practice to use an abrasive blasting technique where the abrasive particles are propelled by high pressure fluid against the solid surface in order to dislodge previously applied coatings, scale, dirt, grease or other contaminants. An example of such a surface is the surface of aircraft.

Commercial airlines and military agencies spend large sums in periodically stripping or abrading paint and other coatings and contaminants from the exterior surfaces of modern aircraft. These surfaces comprise light weight aluminum or other metal alloys, composites, or plastics, which are relatively soft and from which paint or other coatings must be carefully removed to avoid excessive abrasion or chemical damage. Such damage may, in extreme cases, lead to mechanical failure.

Blasting media useful for removing coatings from sensitive metal and composite aircraft or like surfaces preferably meet the following criteria:

1. They should be relatively non-aggressive (Mohs hardness of about 2.0 to less than 4.0);
2. They should be available in various particle size distributions for the treatment of different substrates;
3. They should be free-flowing under high humidity conditions and throughout a broad range of air pressure and media flow rates;
4. They should be water soluble and non-polluting to facilitate easy separation from the insoluble paints and resins stripped to facilitate waste disposal; and
5. They should be non-corrosive to substrates and adjoining surfaces contacted by the blasting media.

Sand blasting, the principal means for cleaning or stripping hard durable surfaces such as granite or heavy steel plating, is too abrasive for removing coatings from sensitive substrates. Blasting techniques have therefore been used on sensitive substrates that employ materials softer than sand, such as plastic materials, walnut shell, and corn cobs. The disadvantages of these softer materials are that they are insoluble and therefore not easily disposable. Additionally, plastics are also expensive.

A blasting medium for removing coating from sensitive substrates containing water-soluble bicarbonate particles, preferably sodium bicarbonate, having average particle sizes of 100 to 500 microns, in admixture with a hydrophobic silica flow-anti-caking agent, has been developed by the owners of the present invention as taught in U.S. Pat. No. 5,160,547 to Kirschner et al. Although effective in removing coatings from substrates, the larger particle sizes of bicarbonate makes it a less efficient blasting medium than blasting medium employing compounds with small particle sizes, such as fine sand, which have better cutting efficiencies. Additionally, more water is needed to wash away the waste produced by bicarbonate-containing blasting medium than is generally used in commercial blasting systems because of the relatively low solubility of bicarbonate in water. Also, sodium bicarbonate particles are not sufficiently hard enough to effectively remove rust from a surface or cause profiling on the surface. Profiling is advantageous because the small indentations caused by the impact of abrasive particles on the surface increase the surface area of the article cleaned to provide an anchor for a new coat of paint.

Another blast medium suitable for removing coatings from sensitive metal and composite surfaces is a blast medium containing water-soluble crystalline sodium sulfate as disclosed in U.S. Pat. No. 5,112,406, also assigned to Church and Dwight Co., Inc. Water soluble sodium sulfate is an effective abrasive for removing coatings from such soft metals as light weight aluminum and the like. Water-soluble sodium sulfate when combined with flow aids does not cake and has an excellent shelf-life and is free-flowing. Sodium sulfate has a Mohs hardness almost the same as sodium bicarbonate. Thus, particles of sodium sulfate are not hard enough to effectively remove rust or cause profiling of a surface. Accordingly, there is a need for a more aggressive abrasive medium which can effectively remove coatings from sensitive surfaces.

A primary object of the present invention is a method for removing coatings from a relatively soft surface with a water-soluble abrasive medium.

Another object of the present invention is to provide for a water-soluble abrasive medium hard enough to cause profiling on a surface.

A further object of the present invention is to provide for a method and blast medium that removes rust from a surface.

Still yet another object of the present invention is to provide for a water-soluble blast media that is environmentally friendly.

Other objects and advantages will become apparent to those of skill in the art from the following description.

SUMMARY OF THE INVENTION

The present invention provides a potassium magnesium sulfate-containing blast media, and a process utilizing such media for removing coatings from sensitive surfaces. Potassium magnesium sulfate blast media effectively remove coatings from substrates, use less water for waste removal, and are relatively inexpensive, compared to bicarbonate-containing blasting media. Additionally, potassium magnesium sulfate is hard enough to cause profiling on a surface and remove rust. Potassium magnesium sulfate is a fertilizer, thus potassium magnesium sulfate is environmentally friendly. Accordingly, no special precautions or costly clean up procedures are necessary after blast cleaning. Potassium magnesium sulfate blast media may be utilized as blast media in pressured air blast systems and at high humidities and under a broad range of finely controlled, high flow rates and air pressures.

DETAILED DESCRIPTION OF THE INVENTION

In accordance with this invention, a process for removing coatings from sensitive substrates is provided, comprising blasting such surfaces with a high velocity water-containing fluid stream, suitably a substantially water-saturated compressed air stream, under a pressure of about 10 to 100 psi, containing as a blast medium water-soluble potassium magnesium sulfate particles having average particle sizes within the range of about 50 to 1000 microns, preferably from about 150 to 500 microns. Preferably, the potassium magnesium sulfate comprises from about 50 to about 90% by weight of the blast medium, and is in admixture with at least about 0.05 to 2.0%, preferably about 0.1 to 0.5%, of a hydrophilic flow aid, a hydrophobic silica flow/anti-caking agent, a hydrophobic polysiloxane anti-caking agent, or a mixture of such agents, by weight of the potassium magnesium sulfate. A suitable hydrophilic flow aid includes, but is not limited to, Sylox 15® (W.R. Grace, Inc.).

Hydrophobic silica, unlike known hydrophilic silicas, is substantially free of non-hydrogen bonded silanol groups and absorbed water. One preferred hydrophobic silica which may be utilized in the blasting media hereof is Aerosol R 972, a product which is available from Degussa AG. This material is a pure coagulated silicon dioxide aerosol, in which about 75% of the silanol groups on the surface thereof are chemically reacted with dimethyldichlorosilane, the resulting product having about 0.7 mol of chemically combined methyl groups per 100 $m^2$ of surface area and containing about 1% carbon. Its particles vary in diameter from about 10 to 40 nanometers and have a specific surface area of about 110 $m^2$/gram. It may be prepared by flame hydrolysis of a hydrophilic silica as more fully described in Angew. Chem. 72, 744 (1960); F-pS 1,368,765; and DT-AS 1,163,784. Further details respecting such material are contained in the technical bulletin entitled "Basic Characteristics and Applications of AEROSOL", Degussa AG, August 1986. The hydrophobic silica particles are admixed with the water-soluble potassium magnesium sulfate blasting agent in the proportion of at least about 0.1 and up to about 1.0% by weight thereof. Another hydrophobic silica is Quso, marketed by DeGussa A.G.

Hydrophobic polysiloxanes, preferably non-halogenated polysiloxanes, suitable for use in the blast media hereof are commercially marketed by Dow Corning and general Electric.

The water-soluble potassium magnesium sulfate of the present invention is also known as langbeinite ($K_2SO_4.2MgSO_4$). Langbeinite or potassium magnesium sulfate is a fertilizer. Accordingly, potassium magnesium sulfate is not harmful to the environment, and costly or time consuming procedures need not be followed when disposing of potassium magnesium sulfate after blast cleaning. Particles of potassium magnesium sulfate have a Mohs hardness greater than 3.0 but less than 3.5. Thus, potassium magnesium sulfate is soft enough such that the particles do not damage soft surfaces during blast cleaning, however, particles of potassium magnesium sulfate are hard enough such that the particles effectively remove rust from a surface. Additionally, particles of potassium magnesium sulfate are also hard enough to cause profiling of a surface. Thus, in addition to removing coatings and contaminants from a surface, the surface cleaned with water-soluble potassium magnesium sulfate also obtains the advantages of rust removal and profiling.

Water-soluble potassium magnesium sulfate or langbeinite can be obtained from any suitable source. U.S. Pat. No. 3,617,243 and U.S. Pat. No. 3,726,965 disclose methods of producing a potassium magnesium sulfate which can be employed to practice of the present invention, their disclosures of which are incorporated herein in their entireties by reference.

In addition to potassium magnesium sulfate, the blast media of the present invention may contain additional abrasive blast media to assist in rust inhibition, grease and oil removal as well as for adjusting the pH of the blast media in solution and the like. Non-limiting examples of water soluble blast media which can be utilized include the water soluble alkali metal and alkaline earth metal salts such as the carbonates, bicarbonates, silicates, the hydrates of the above, etc. Preferred are the alkali metal salts and, in particular, the sodium and potassium bicarbonates. Bicarbonates are preferred because they provide pH levels in solution below pH 10. Also useful are sodium sesquicarbonates such as natural sodium sesquicarbonate known as trona. It is important to note that by water soluble is not meant completely water soluble as some natural minerals including the preferred trona may contain minor amounts of insoluble materials. For example, trona may contain up to about 10 wt. % insolubles. Besides being water soluble, it is also preferred that the soft blasting media be nontoxic and capable of being washed away from the blasting site without adversely affecting the environment. The Mohs hardness of such alkali metal blast media ranges from about 2.5 to about 3.0. Such alkali metal salts are included in the blast media in amounts of from 0–50%, preferably about 10–40%, most preferably from about 15–30% by weight of the dry blast medium.

The blast media of the present invention can also contain a hard abrasive which can provide additional profiling on a surface in amounts which do not adversely affect the mechanical integrity of the structure being blast cleaned for the removal of caking layers. The blast media of the present invention may encompass the use of a hard abrasive having a hardness of at least 5.0, preferably at least 6.0 and even about 7.0 and above on the Mohs scale. Such hard abrasives are included in the blast media in amounts of from 0–50%, preferably from about 10–30% by weight of the dry weight of the blast medium. Non-limiting examples include aluminum oxide, silicon carbide, glass, tungsten carbide, garnet, Starblast®, etc. The preferred hard abrasive is aluminum oxide.

Blast media thus constituted are useful for efficiently cleaning or de-coating sensitive metals, e.g., aluminum or aluminum alloys, magnesium or composite substrates, such as utilized on exterior aircraft surfaces, masonry, stucco, plaster or wood. The blast media is especially effective in removing rust from metal surfaces and profiling the surface. Such blast media are preferably applied in commercial compressed air streams, i.e., streams which are substantially saturated with moisture (90% or higher relative humidities) and which may contain oil contaminants from compressors; in commercial pressured water blast systems; or in commercial combination pressurized air-water blast systems. In the latter, a stream of water is added to the media/air stream to cool the workpiece and control dust formation, although the addition of water may reduce the coating removal rate somewhat.

The potassium magnesium sulfate blasting media may be applied at flow rates of about 0.5 to 15, desirably about 1.0 to 4.0, pounds per minute and under air pressures of about 10 to 100 psi, from ⅛ inch or larger blasting nozzles.

It has been found that optimal productivity for blast cleaning a surface with potassium magnesium sulfate can be achieved by a venturi-type blast nozzle characterized more accurately than by the mere relative total length to inlet length of the blast nozzle. It has been found that optimal productivity can be achieved if the outlet length, that being the length of the venturi-type nozzle immediately downstream of the orifice (throat) to the outlet of the nozzle, is approximately 20 times the diameter of the orifice. Thus, it has been found that an outlet length which is 18 to 24 times the orifice diameter provides optimal productivity. At outlet lengths below the range just cited, productivity is adversely affected. At lengths above the range, productivity is no longer improved or may be adversely affected. Along with the outlet length, optimal productivity is achieved if the outlet diameter is approximately 1.5 times the orifice diameter. Deviations of more than 10% below this parameter adversely affects productivity. Thus, the outlet diameter should be at least 1.35 times the orifice diameter. Deviations above 1.65 times the orifice diameter do not show benefits at media flow rate typically used to blast with sodium bicarbonate, i.e., 2–4 lbs./min. At higher flow rates larger nozzle outlets may show productivity improvements.

With softer and friable blast media, passable through the converging inlet section of the venturi-type blast nozzle often degrades the particle of the media, creating particles of smaller mass and often causing turbulent flow in the inlet section thereby reducing the velocity of the particles as they travel through the blast nozzle. The loss of mass and velocity reduces the force of the particle on the targeted surface and, thus, can reduce productivity of the nozzle. Thus, the converging inlet section of the nozzle should converge at a relatively minor angle, typically from between about 5 to 15° from horizontal, preferably, approximately 10°. To further eliminate turbulent flow, the diameter of the inlet should be approximately equivalent to the inside diameter of the blast hose which supplies the blast media to the nozzle. Preferably, the inlet diameter should not deviate more than approximately 25% plus or minus from the inlet diameter of the supply hose. The longitudinal length of the orifice is optimum at lengths about equivalent to the orifice diameter. Larger orifice lengths have not been found to yield any significant improvement in productivity.

While stainless steel nozzles can be used to direct a soft media such as sodium bicarbonate to a targeted surface, harder abrasives such as potassium magnesium sulfate and aluminum oxide and the like tend to erode the internal surfaces of a stainless steel nozzle. Accordingly, the blast nozzle can be formed of a hard ceramic substance having the parameters described above. Such a blast nozzle is disclosed in U.S. Pat. No. 5,484,325, assigned to Church and Dwight and incorporated herein in its entirety by reference. Thus, the interior surface of the blast nozzle can be formed from tungsten carbide, silicon carbide, boron carbide, silicon nitride, etc. or any other hard ceramic material which is abrasive resistant especially to hard blast media such as sand, aluminum oxide, and other ceramic blast media.

A particularly preferred blast nozzle is formed from reaction bonded silicon nitride. Briefly, the silicon nitride nozzle is made from a packing mixture consisting of silicon nitride powder and a deification aid selected from a group of materials consisting of magnesium oxide, yttrium oxide, cerium oxide and zirconium oxide. The processes for forming reaction bonded silicon nitride articles are disclosed in U.S. Pat. Nos. 4,235,857; 4,285,895; 4,356,136; 4,337,542; and 4,388,414, all assigned to Ford Motor Co. and incorporated herein by reference. A particular useful nozzle is a reaction bonded silicon nitride nozzle formed by Ceradyne, Inc., Costa Mesa, Calif., under the tradename Ceralloy 147-31E.

While the nozzle parameters as described above have been optimized for improving blast cleaning with a soft media such as sodium bicarbonate, the formation of blast nozzles from a hard ceramic allow such nozzles to be used for blast cleaning with harder, more dense substances either added with the softer abrasive or as the sole abrasive agent. It is believed that the parameter for nozzle outlet length as described above will improve productivity of blast cleaning using the harder, more dense abrasive media even though the exact ratios of nozzle length to orifice diameter, outlet diameter to orifice dilator, etc. as described above may not yield the most optimum productivity with all the harder abrasives.

The parameters, as above described, define a nozzle having a circular cross-section of specified orifice and outlet areas and angle of divergence in the outlet section. Accordingly, the dimensions of a nozzle of any cross-section can be calculated based on the described ratios.

As indicated, above, and as more fully documented below, in accordance with the present invention it has been found that blast media so constituted and applied do not cake, have excellent shelf lives, and are free-flowing. They may thus be readily employed in commercial blasting operations for removing coatings and rust from sensitive hard surfaces.

The following example illustrates the cutting efficiencies obtained by the blast media of the present invention. In the example, all parts and percentages are given by weight and all temperatures in °F. unless otherwise indicated.

EXAMPLE I

Qualitative Blasting Performance of Potassium Magnesium Sulfate Compared to Sodium Bicarbonate and Sodium Sulfate The first test compared the ability of potassium magnesium sulfate ($K_2SO_4 \cdot 2MgSO_4$) to remove corrosion products from a badly rusted piece of steel about 6"×12" in size compared with the ability of sodium bicarbonate and sodium sulfate to remove corrosion products.

The 6"×12" steel panel was dark grey, almost black in color, with a dark red patina across the surface. Red rust residues readily came off from the panel's surface. Each blast medium tested was used to blast clean a 3 inch wide swath of the rusted steel panel. The blasting was done with a #4 ARMEX® Performance Nozzle at a blast pressure of about 60 psi, and a media flow rate of about 1.5 lbs/min. The nozzle was held from about 4 to about 6 inches from the steel plate. The blast cleaning was done in a blast cabinet.

Test sample 1 contained sodium bicarbonate and silicon dioxide flow aid, and was used to blast clean a 3 inch wide swath of the steel panel. Visual analysis indicated that the sodium bicarbonate blast medium removed the surface rust, but did not remove the dark color or the dark red patina.

Test sample 2 contained sodium sulfate without any additional components, and was used to clean a second 3 inch swath. The sodium sulfate performed the same as the sodium bicarbonate. The sodium sulfate removed the surface rust, but not the dark color or the deeper rust.

The third test sample contained potassium magnesium sulfate without any additional abrasives or flow aids, and was used to clean a third 3 inch swath of the steel panel. The potassium magnesium sulfate removed the rust and achieved a near white metal finish on the steel. The near white finish on the steel surface indicated that the potassium magnesium sulfate removed metal and excavated the deep rust below the steel plate surface.

The surface profile of the steel plate was below the detection limits of Press-O-Film™ surface profile analysis. To confirm that the potassium magnesium sulfate removed metal, test samples 1–3 were blasted at the above conditions on a 6"×12" polished stainless steel plate. Test samples 1 and 2 containing the sodium bicarbonate an sodium sulfate formulations, respectively, showed no alterations on the steel surface. However, the potassium magnesium sulfate of test sample 3 destroyed the polish providing a matte finish. Although the surface profile was below the detection limits of the Press-O-Film™ surface profile analysis, the visable surface alterations confirmed that potassium magnesium sulfate removed metal.

The results showed that potassium magnesium sulfate can remove rust not only from the surface of metal, but also can penetrate the surface to remove deep rust from the matrix of metal with minimal alteration of the metal surface. In contrast, the sodium bicarbonate and sodium sulfate blast media were unable to penetrate the matrix of the steel surface to remove deep rust, but only removed surface rust.

EXAMPLE II

Productivity of Potassium Magnesium Sulfate Versus Sodium Bicarbonate Blast Media Six 2'×2' mild steel panels with about a 1.5 mil profile were coated with two layers of epoxy paint resulting in a paint thickness of about 12 mils. The blasting parameters were set at a #6 Profile Performance Nozzle, about 60 psi blast pressure, about 60 degrees blast angle, about 12 inches standoff distance and a media flow rate of about 2.0 lbs/min. The ARMEX® Technical Center's X-Y table was utilized. The X-Y table held the test panels and moved them in front of the blast nozzle at a computer controlled rate. Each mild steel test panel was moved in front of the nozzle at varying traversing speeds in both the X and Y direction for each blast medium tested to determine the optimal paint removal speed for the above blasting parameters. The optimal paint removal speed is the highest productivity achievable at the blasting parameters. Productivity is the measure of the volume of coating removed per unit of time and is expressed in units of mil-sq. ft./min.

Three compositions were tested for their ability to remove the epoxy paint from the mild steel plates. Test sample 1 contained sodium bicarbonate, silicon dioxide (flow aid), sodium lauroylsarcosinate (surfactant), magnesium oxide (anticorrosion agent) and aluminum oxide (hard abrasive). Test sample 2 was composed of sodium bicarbonate and silicon dioxide, and test sample 3 contained potassium magnesium sulfate. The optimal productivity was determined for each blast medium on each panel and the average optimal productivity for each blast medium was then determined. The potassium magnesium sulfate had an average optimal productivity of about 2.87 mil-sq.ft./min. Test sample 1 had an average optimal productivity of about 1.82 mil-sq.ft./min. and test sample 2 had an average optimal productivity of about 1.02 mil-sq.ft./min. Thus, potassium magnesium sulfate showed superior productivity in removing 2 coats of epoxy paint from a mild steel surface as compared to the sodium bicarbonate blast media.

What is claimed is:

1. A method of blast cleaning a solid surface by propelling blast medium particles in a high velocity fluid stream against the solid surface to remove contaminants from the solid surface, said particles comprising water-soluble potassium magnesium sulfate having an average particle size of 50 to 1,000 microns.

2. The method of claim 1, wherein the fluid stream is a substantially water-saturated compressed air stream, a pressurized water blast stream, or a combination of pressurized air and water blast streams.

3. The method of claim 2, wherein the fluid stream is a compressed air stream having 90% or higher relative humidity and is under pressures of 10 to 100 psi.

4. The method of claim 1, wherein the fluid stream is applied to the solid surface at a rate of 0.5 to 15 pounds of the particles per minute.

5. The method of claim 1, wherein the particles have an average particle size within the range of 150 to 500 microns.

6. The method of claim 1, wherein the blast medium further comprises a flow aid/anti-caking agent.

7. The method of claim 6, wherein the flow aid/anti-caking agent is present in an amount of about 0.5 to 2.0% by weight of the potassium magnesium sulfate and comprises a hydrophilic flow aid, a hydrophobic silica flow/anti-caking agent, a hydrophobic polysiloxane anti-caking agent, or mixtures of such agents.

8. The method of claim 7, wherein the hydrophobic silica is substantially free of non-hydrogen bonded silanol groups and absorbed water.

9. The method of claim 1, wherein the potassium magnesium sulfate comprises from about 50 to about 90% by weight of the blast medium.

10. The method of claim 1, wherein the blast medium further comprises alkali metal salts.

11. The method of claim 10, wherein the alkali metal salts comprise sodium or potassium carbonate or bicarbonate or mixtures thereof.

12. The method of claim 11, wherein the alkali metal salt comprises sodium bicarbonate.

13. The method of claim 10, wherein the alkali metal salts comprise from about 10 to about 50% by weight of the blast medium.

14. The method of claim 1, wherein the blast medium further comprises hard abrasives having a Mohs hardness of at least 5.0 to assist in cleaning, and profiling of the substrate surface.

15. The method of claim 14, wherein the hard abrasives comprise aluminum oxide, silica or mixtures thereof.

16. The method of claim 1 wherein the solid surface is aluminum or aluminum alloy, magnesium or a composite substrate.

17. A blast medium for removing contaminants and for profiling a solid surface, comprising water soluble potassium magnesium sulfate having an average particle size of 50 to 1,000 microns and a flow aid/anti-caking agent in an amount of about 0.5 to 2.0% by weight of the potassium magnesium sulfate.

18. The blast medium of claim 17, wherein the potassium magnesium sulfate comprises from about 50 to 90% by weight of the blast medium.

19. The blast medium of claim 17, wherein the flow aid/anti-caking agent comprises a hydrophilic flow aid, a hydrophobic silica flow/anti-caking agent, a hydrophobic polysiloxane anti-caking agent or mixtures of such agents.

20. The blast medium of claim 19, wherein the hydrophobic silica is substantially free of non-hydrogen bonded silanol groups and absorbed water.

21. The blasting medium of claim 17, further comprising water-soluble alkali metal salts.

22. The blasting medium of claim 21, wherein the water-soluble alkali metal salts comprise sodium or potassium carbonate or bicarbonate or mixtures thereof.

23. The blasting medium of claim 21, wherein the water-soluble alkali metal salts comprise from about 10 to about 50% by weight of the blast medium.

24. The blasting medium of claim 17, further comprising hard abrasives to assist in cleaning, profiling the substrate surface.

25. The blasting medium of claim 24, wherein the hard abrasives comprise aluminum oxide, silica or mixtures thereof.

* * * * *